United States Patent [19]

Masaichi

[11] 4,086,704
[45] May 2, 1978

[54] COMBINATION TOOL MOUNT AND CENTERING DEVICE

[75] Inventor: Sato Masaichi, Fujinomiya, Japan

[73] Assignee: Yugen Kaisha Sato Seimitsu Kanagata Seisakusho, Fujinomiya, Japan

[21] Appl. No.: 763,537

[22] Filed: Jan. 28, 1977

[30] Foreign Application Priority Data

Feb. 24, 1976 Japan .................. 51-114514

[51] Int. Cl.² ............................................. G01B 3/22
[52] U.S. Cl. ................................ 33/169 C; 33/172 D
[58] Field of Search ............. 33/169 C, 172 D, 185 R

[56] References Cited

U.S. PATENT DOCUMENTS

| 477,104 | 6/1892 | Darling | 33/143 J |
|---|---|---|---|
| 821,651 | 5/1906 | Landraf | 33/169 C |
| 1,109,625 | 9/1914 | Cooper | 33/169 C |
| 1,300,428 | 4/1919 | Lowenstein | 33/169 C |
| 2,090,178 | 8/1937 | Brickner | 33/169 C |

FOREIGN PATENT DOCUMENTS 644,902  10/1950  United Kingdom ............. 33/169 C

*Primary Examiner*—William D. Martin, Jr.

[57] ABSTRACT

A machine tool mount which can concurrently serve for centering or positioning the spindle of a machine tool. Within a socket holding a shaft to be fitted to the spindle is an externally rotatable eccentric shaft, a movable piece contacting said eccentric shaft, a pressing piece contacting a spherical surface of said movable piece and a sphere contacting said pressing piece. The front of said sphere is held in the socket by means of a semispherical cover having a central hole through which projects a centering needle. The centering needle is removably attached to the front of the sphere.

11 Claims, 5 Drawing Figures

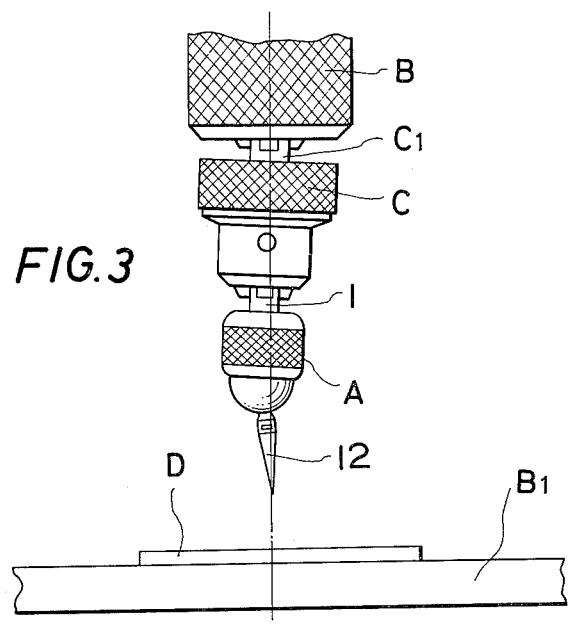
FIG.3
FIG.4  FIG.5
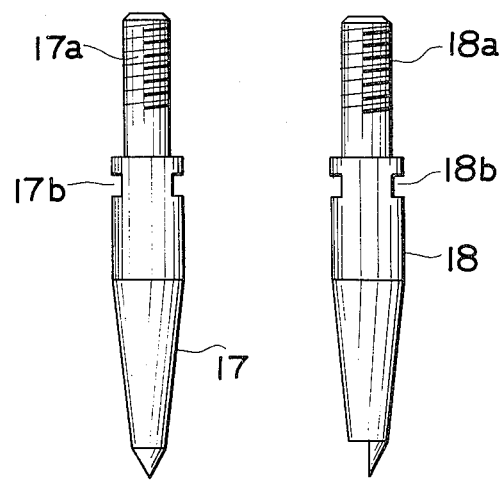

COMBINATION TOOL MOUNT AND CENTERING DEVICE

This invention relates to a combination tool mount and centering device for a machine tool.

BACKGROUND OF THE INVENTION AND PRIOR ART

For the purpose of centering or positioning the spindle of a machine tool such as a milling machine, a radial cutting machine or a drilling machine, a spindle equipped with a centering microscope is commonly used, and the surface of the work is observed under the microscope and a cross-mark in the field of vision is matched with a mark on the work.

According to this method, however, an expensive special microscope has to be provided for the sole purpose of centering or positioning the spindle and work relative to each other; skill and experience are required for using the microscope; and it takes a relatively long time for centering or positioning the spindle. This is detrimental to efficiency of the machining operation. Moreover, the use of an optical instrument for centering or positioning is likely to produce an error due to the instrument itself. Furthermore, for mahining work with a high precision, a correspondingly high precision machine tool and accessories are needed. Thus, not only is the cost of the machine tool increased, but also the cost of the product is increased.

The sole use of a conventional centering device is for centering, and after centering or positioning is achieved, the whole device including a centering needle fixed thereto has to be removed from the spindle chuck of the machine tool and thereafter a cutting tool has to be fitted into the chuck for the machining operation.

Thus, a centering device which can function only as such has limited applicability. When the centering device is exchanged for a cutting tool after centering has been achieved, the tool to be used is not always fitted into the chuck in the same position as the centering device; and accordingly a miscentering which occurs during fitting the tool into the chuck cannot be corrected. For this reason there has been a keenly felt need for development of a new centering device which has a simplified construction, is inexpensive to manufacture and can be readily and easily used for high precision centering.

BRIEF SUMMARY OF THE INVENTION

The primary object of the present invention is to provide a device with which an unskilled worker can easily and quickly center or position the spindle of a machine tool, even without the use of a special microscope.

Another object of the present invention is to provide a cheap device having a simple construction which can achieve high-precision centering, even in a machine tool, and accessories therefor which are somewhat lacking in precision and yet cause no error.

Still another object of the present invention is to provide a device which can serve not only as a spindle-centering device, but also as a tool mount for tools for cutting or marking a workpiece.

To attain these objects, the present invention provides a tool mount serving at the same time as a centering device which is entirely free from the drawbacks of the conventional centering device described above, and which is constituted by a socket having thereon a shaft for fitting the spindle; an externally rotatable eccentric shaft, a movable piece contacting said eccentric shaft, a pressing piece contacting a spherical surface on said movable piece, and a sphere having the circumference contacting said pressing piece housed in said socket in the recited order, a semi-spherical cover holding the front of said sphere in said socket and having a central centering needle hole therein, and a centering needle removably mounted on the front of the sphere and projecting through said centering needle hole.

The above-described objects, other objects and novel features of the present invention will become more apparent from the following detailed description and the attached drawings, which are only for the purpose of illustration and are not intended to limit the scope of the present invention.

BRIEF DESCRIPTION OF THE DRAWINGS

FIG. 3 is an elevation view of the chuck serving concurrently as a centering device of this invention attached to the spindle of a machine tool;

FIG. 4 is a front elevation view of a center drill which can be mounted in the tool mount; and FIG. 5 is a front elevation view of a marking needle which can be mounted in the tool mount.

DETAILED DESCRIPTION OF PREFERRED EMBODIMENTS

Figure 1:
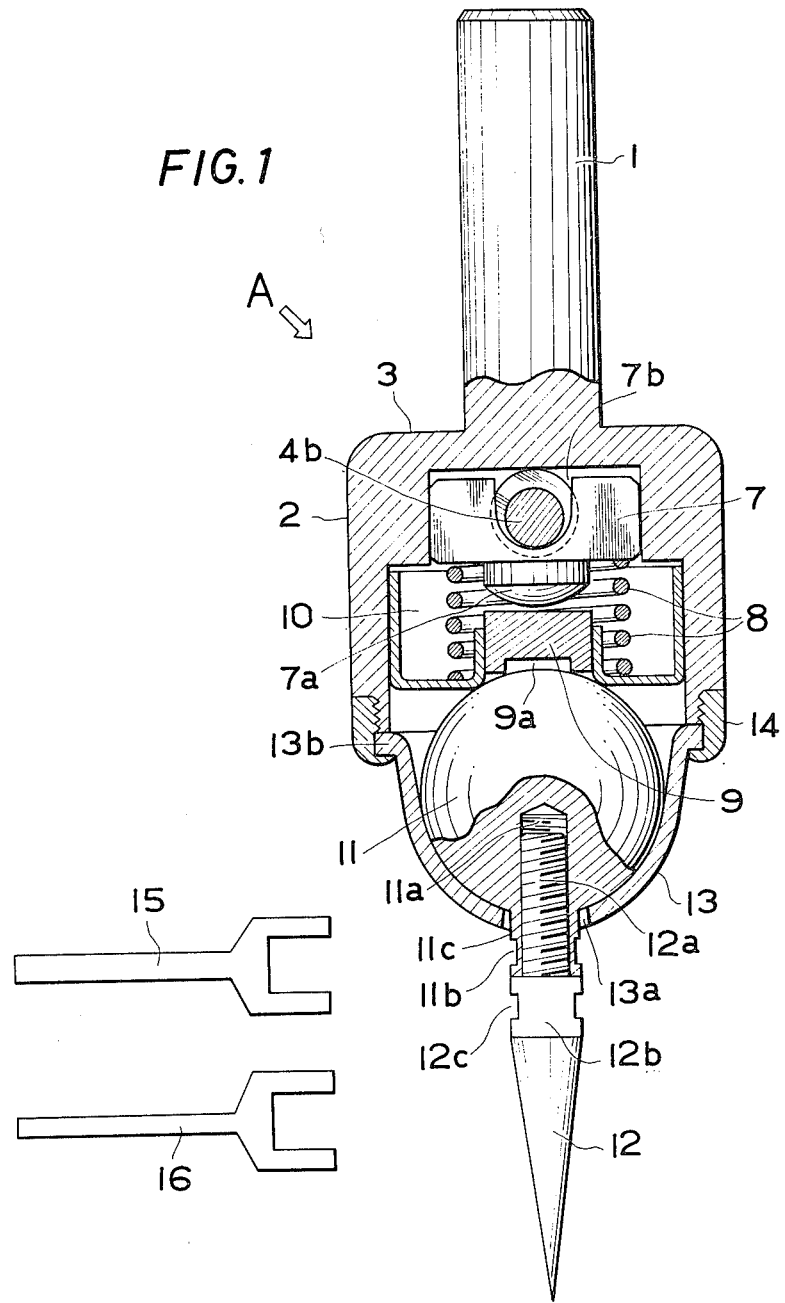
FIG. 1 is a partial axial sectional view showing the combination tool mount and centering device according to the present invention.
Figure 2:
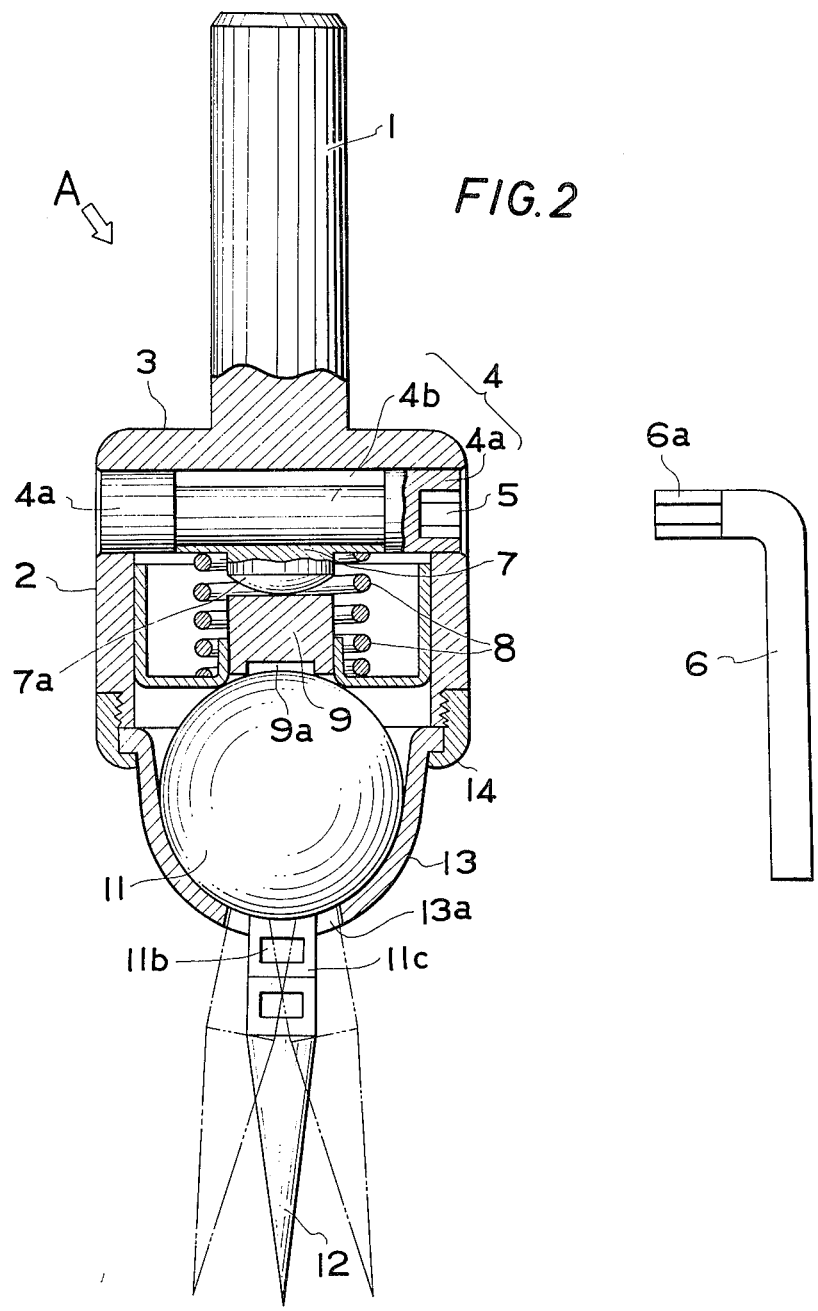
FIG. 2 is a view similar to FIG. 1 and taken at right angles thereto.

To the lower end of a shaft 1 of the tool mount and centering device of the present invention is integrally joined the central part of the top plate 3 of a cylindrical socket 2 axially aligned with the central axis of the shaft 1.

At the top of the socket 2 is provided a rotatable eccentric shaft 4 extending perpendicular to the central axis of the shaft 1.

Said eccentric shaft 4 has two end portions 4a rotatable within the socket 2 and a middle portion 4b having a smaller diameter than the end portions 4a and eccentrically positioned in relation to the central axis around which the end portions 4a are rotatable. In one of these end portions 4a is a polygonal cross-section hole 5 into which fits the polygonal cross-section end 6a of a wrench 6. Rotation of the spanner 6 causes rotation of the eccentric shaft 4.

The middle portion 4b of the eccentric shaft 4 engages the surface of a U-shaped groove 7b in the top of a movable piece 7. Said movable piece 7 is slidable along the inner walls of a recess in the socket 2 in the axial direction of said socket when said eccentric shaft 4 is rotated. A spherical surface 7a projects downwardly from movable piece 7.

Below said movable piece 7 and spaced slightly therefrom is a columnar pressing piece 9 having a circular recess 9a formed in the center of the bottom thereof.

Said pressing piece 9 is held by the inner annular flange of a spring carrying hollow piston 10. Between the bottom of said spring carrying piston 10 and the under side of said movable piece 7 is a spring 8 which forces the spring carrying piston 10 and the movable piece 7 away from each other. The outer cylindrical surface of the spring carrying piston 10 is slidable along the inner wall of the socket 2.

In the recess 9a of the pressing piece 9 is located a sphere 11, the surface of which is in contact with the rim of said recess 9a. Below the level of the center of said sphere 11 is a threaded hole 11a extending radially into the sphere 11 from a tool mounting projection 11c. The projection 11c has wrench engaging flats 11b on the outside thereof. Into the threaded hole 11a can be removably threaded the threaded end portion 12a of a centering needle 12.

On the middle portion of the centering needle 12 is a stop 12b for limiting the distance said needle 12 can be threaded into said sphere 11. On the outside of said stop 12b are wrench engaging flats 12c.

In the lower portion of a semispherical cover 13 is a circular hole 13a large enough to permit slight oscillation of the centering needle 12 away from the axis of the socket. The semispherical cover 13 supports the sphere by contacting the lower semispherical portion of the sphere 11. A flanged portion 13b around the top edge of said cover 13 is supported by a ring 14 which is threaded onto the lower edge of the socket 2.

The center of the spherical surface 7a of said movable piece 7, the axis of said pressing piece 9 and the recess 9a and the center of the sphere 11 lie on the axis of the shaft 1.

An example of the manner of using the tool mount and centering device will now be described.

As shown in FIG. 3, the shaft $C_1$ of a common chuck C is mounted in the spindle B which is rotatable around an axis perpendicular to the top surface of the bed $B_1$ of a drilling machine (not shown). In this chuck C is mounted the shaft 1 of the tool mount and centering device A of the present invention.

If the motor of the drilling machine is started, the spindle B, the chuck C and the device A turn and the centering needle 12 is rotated.

If the tip of the needle 12 as viewed from the side is oscillating, i.e. depicting a circle, it means that the tip of the needle 12 is offset from the axis of the spindle B.

In such a case, the centering needle 12 is pressed sideways so that the tip of the needle 12 is displaced in the direction toward the rotational axis. That is, it moves onto the axis of the spindle B. In other words, the needle 12 is pressed sideways until its tip, which has been depicting a circle, is at a fixed point during rotation. With the rotational axes of the needle 12 and the sphere 11 thus adjusted, the tip of the needle 12 ceases to oscillate.

When the oscillation of the tip of the needle 12 disappears completely, i.e. when the needle 12 has been perfectly centered, the control means (not shown) of the drilling machine is operated to match the tip of the needle 12 with a desired mark on the work D on the bed $B_1$, and thus the marking position and size can be decided.

Next, for the purpose of making a centering hole in the work D, the spindle B and both chucks C and A are stopped and the polygonal cross-section end 6a of the wrench 6 is inserted into the hole 5 and then the wrench 6 is turned in the direction for lowering the middle portion 4b of the eccentric shaft as much as possible. Thereby the movable piece 7 is moved down against the force of the spring 8 and the pressing piece 9 is pushed downward to press the spherical surface 7a of the movable piece 7 into contact with the top surface of the pressing piece 9. The downward force acting on the pressing piece 9 causes a downward force to act on the sphere 11 and the sphere 11 is thus pressed against the inner surface of the semispherical cover 13 to produce a frictional force between the sphere 11 and the cover 13 to prevent rotation of the sphere 11.

Then one open end wrench 15 is engaged with the flats 11b on the projection 11c on the sphere 11 to prevent the rotation of the sphere 11, and another wrench 16 is engaged with the flats 12c on the centering needle 12 and then this wrench 16 is turned to unscrew the threaded portion 12a of the centering needle 12 from the threaded hole 11a in the sphere 11, thereby removing the needle 12 from the sphere 11.

When the needle 12 is removed, the threaded portion 17a of a center drill 17 as shown in FIG. 4 is screwed into the threaded hole 11a in the sphere 11 and in the same way as above, one wrench engages the flats 11b to prevent rotation of the sphere 11, while the other wrench 16 engages the flats 17b of the center drill 17, and by turning the wrench 16, the center drill 17 is firmly secured to the sphere 11.

After the centering needle 12 and the center drill 17 are exchanged, the motor of the drilling machine is restarted to turn and lower the spindle B, the chuck C, the chuck A and the center drill 17. Thus, when the tip of the center drill 17 touches the surface of the work D, a centering hole is formed in the surface of the work D.

For the purpose of marking the surface of the work D in the same way as the centering needle 12 is replaced for the center drill 17, the centering needle 12 is replaced by the marking needle 18 shown in FIG. 5 and the latter is turned.

When the work D is moved while the surface is in contact with the tip of the marking needle 18, the surface of the work D can be marked. In FIG. 5, 18a denotes the threaded portion of the marking needle 18 and 18b denotes the portion of the marking needle 18 engaged by the wrench 16.

The combination tool mount and centering device according to the present invention, being constituted and used as described above, makes it possible for any worker, nonskilled or insufficiently skilled, to carry out high-precision centering of the spindle easily and quickly, and with remarkable efficiency, and without use of any expensive microscope such as provided in the conventional centering device.

Since no mircroscope is utilized, unlike in the conventional device, there is no likelihood of an error occurring due to the optical instrument itself; and even if the machine tool and the accessories therefor are not very precise, the centering or positioning can be executed with high precision, thereby cutting the costs of the machine tool itself and the product machined thereby.

Since the device according to this invention has a centering needle removably attached thereto, the centering needle which is a part of the centering device has only to be replaced by a tool such as a center drill or a marking needle instead of the whole centering device being replaced with a tool which has a spindle mounting stem, after the spindle has been centered or positioned. Thus, the centering device according to the present invention can concurrently function as a tool mount.

The fact that the whole centering device need not be replaced after the centering has been finished means that the shaft of the centering device need not be removed from the upper chuck.

When the device is removed from the upper chuck, a fitting error, i.e. centering error, occurs, even if slight, unless the tool is attached in absolutely the same position of the centering device being removed.

According to the present invention in which there is no need to remove the whole centering device from the upper chuck, there is no possibility of the above-mentioned error taking place; and in replacing the centering needle with a tool, say a center drill, there is no possibility of the centering being disturbed, because a simple rotation of the eccentric shaft can reliably prevent rotation of the sphere. The movable piece which is lowered by turning the eccentric shaft has the spherical surface in contact with the pressing piece, and accordingly, there is no possibility of the direction of movement of the pressing piece being restricted by the direction of movement of the movable piece; and since the pressing piece contacts the spherical surface of the sphere, there is no possibility of the sphere being turned due to the direction of movement of the pressing piece.

Therefore, when the eccentric shaft is turned, the sphere is firmly fixed in its position and accordingly there is no possibility of the centering of the centering needle being disturbed.

As explained above, the present invention can solve the problems of conventional centering devices, and being usable both as a centering device and as a tool mount has a number of effects unobtainable in the conventional devices.

It is apparent that a wide variety of other embodiments are possible without departing from the spirit and scope of the invention. Thus, the present invention is not restricted by any other limitations than those given in the attached claims.

What is claimed is:

1. A combination tool mount and centering device, comprising:
    a socket having a mounting shaft extending from the closed end thereof for mounting in the spindle of a machine tool;
    an eccentric shaft rotatably mounted in the inner end of said socket for rotation around an axis transverse to the axis of said socket, said eccentric shaft being rotatable from outside of said socket;
    a movable piece in said socket engaged with said eccentric shaft and movable in the direction of the axis of said socket by the rotation of said shaft;
    a sphere in said socket and having the spherical surface thereof engaged by said pressing piece;
    a semispherical cover over the open end of said socket against which the spherical surface of said sphere is engaged for holding said sphere in said socket;
    a centering needle removably mounted on said sphere, said semispherical cover having an aperture therein through which said centering needle projects; and
    a pressing piece mounted in said socket between said movable piece and said sphere for movement in the direction of the axis of said socket;
    one of said pieces having a spherical surface thereon projecting toward the other piece and engaging said other piece when said eccentric shaft is in a position toward said sphere for pressing said sphere into frictional locking engagement with said cover; and
    a resilient means between said movable piece and said pressing piece and urging them away from each other when said eccentric shaft is in a position away from said sphere.

2. The device of claim 1 in which said movable piece has a U-shaped groove in which said eccentric shaft contacts said movable piece.

3. The device of claim 1 in which said spherical surface is on said movable piece and contacts said pressing piece.

4. The device of claim 1 in which said pressing piece has a circular recess in the end thereof toward said sphere and the edge of said recess contacts the spherical surface of said sphere.

5. The device of claim 1 in which said resilient means is a coil spring.

6. The device of claim 1 in which said centering needle is threadedly mounted on said sphere.

7. The device of claim 1 in which said sphere has a projection thereon into which said centering needle is mounted, said projection having a shape for engagement by a wrench for holding the sphere while the centering needle is removed therefrom.

8. The device of claim 1 in which said centering needle has a stop thereon for limiting the distance which said centering needle can extend into said sphere, said stop having a shape for engagement by a wrench for removing the centering needle from said sphere.

9. The device of claim 1 in which said aperture in said spherical cover is larger than the outside dimension of said centering needle, whereby said centering needle can oscillate slightly around the axis of said socket.

10. The device of claim 1 in which the end of said eccentric shaft has a polygonal recess therein exposed to the exterior of said socket for engagement by a polygonal head of a wrench for turning said eccentric shaft.

11. The device of claim 1 in which the central axis of said socket, the center of said movable piece, the cental axis of the pressing piece, the center of the sphere and the cental axis of the centering needle lie on the axis of said mounting shaft.

* * * * *

UNITED STATES PATENT AND TRADEMARK OFFICE
CERTIFICATE OF CORRECTION

PATENT NO. : 4,086,704
DATED : May 2, 1978
INVENTOR(S) : Masaichi Sato

It is certified that error appears in the above-identified patent and that said Letters Patent are hereby corrected as shown below:

Title page, line [75], change "Sato Masaichi" to -- Masaichi Sato --.

*Signed and Sealed this*

*Twenty-ninth* Day of *August 1978*

[SEAL]

Attest:

RUTH C. MASON
*Attesting Officer*

DONALD W. BANNER
*Commissioner of Patents and Trademarks*